(12) United States Patent
Nagao

(10) Patent No.: US 6,646,087 B2
(45) Date of Patent: Nov. 11, 2003

(54) METHOD OF MANUFACTURING ETHYLENE-VINYL ACETATE COPOLYMER

(75) Inventor: Yoshiharu Nagao, Kurashiki (JP)

(73) Assignee: Nippon Synthetic Chemical Industry Co., Ltd., Osaka (JP)

( * ) Notice: Subject to any disclaimer, the term of this patent is extended or adjusted under 35 U.S.C. 154(b) by 0 days.

(21) Appl. No.: 09/983,857

(22) Filed: Oct. 26, 2001

(65) Prior Publication Data

US 2002/0077438 A1 Jun. 20, 2002

(30) Foreign Application Priority Data

Oct. 27, 2000 (JP) ........................................ 2000-328205

(51) Int. Cl.⁷ ............................................. C08F 218/08
(52) U.S. Cl. ........................................ 526/331; 526/319
(58) Field of Search ................................. 526/331, 319

(56) References Cited

U.S. PATENT DOCUMENTS

| | | | | | |
|---|---|---|---|---|---|
| 3,294,754 A | * | 12/1966 | Naarmann et al. | ............ | 526/67 |
| 3,507,849 A | * | 4/1970 | Danes, Jr. | ............ | 526/62 |
| 3,738,974 A | * | 6/1973 | Takehisa et al. | ............ | 526/62 |
| 3,891,603 A | * | 6/1975 | Heil et al. | ............ | 526/287 |
| 3,983,096 A | * | 9/1976 | Segalini | ............ | 526/330 |
| 4,164,489 A | * | 8/1979 | Daniels et al. | ............ | 524/733 |
| 4,485,225 A | * | 11/1984 | Satoh et al. | ............ | 526/210 |
| 4,649,186 A | * | 3/1987 | Jenkins et al. | ............ | 526/218.1 |
| 4,657,994 A | * | 4/1987 | Tanaka et al. | ............ | 422/138 |
| 5,145,923 A | * | 9/1992 | Hobes et al. | ............ | 526/193 |
| 5,744,547 A | * | 4/1998 | Moritani et al. | ............ | 525/62 |
| 5,804,676 A | * | 9/1998 | Hieda et al. | ............ | 526/65 |

FOREIGN PATENT DOCUMENTS

| | | |
|---|---|---|
| JP | 2-52922 | 11/1990 |
| JP | 11-116637 | 4/1999 |
| JP | 11-116638 | 4/1999 |

* cited by examiner

*Primary Examiner*—Judy M. Reddick
(74) *Attorney, Agent, or Firm*—Wenderoth, Lind & Ponack, L.L.P.

(57) ABSTRACT

A method of manufacturing an ethylene-vinyl acetate copolymer is provided which suppresses the formation of scale and gelled product. In a continuous polymerization of ethylene and vinyl acetate in a polymerizing vessel with a cooling jacket and/or coil, the heat transfer area of the jacket and/or coil and the polymerizing calorific value per hour satisfy the following formula:

$$A < Q/2000$$

wherein A is the heat transfer area ($m^2$) and Q is the calorific value (kcal/hr) for polymerization.

4 Claims, No Drawings

METHOD OF MANUFACTURING ETHYLENE-VINYL ACETATE COPOLYMER

BACKGROUND OF THE INVENTION

The present invention relates to a method of manufacturing an ethylene-vinyl acetate copolymer, and more particularly to a method of manufacturing an ethylene-vinyl acetate copolymer which can suppress formation of gelled substance and scales, and which can produce the copolymer as a raw material of saponified products of ethylene-vinyl acetate copolymer which have excellent moldability.

Since saponified products of ethylene-vinyl acetate copolymer are superior in various properties such as gas barrier properties and mechanical strength, they are widely used for various applications as films, sheets and fibers.

Such a saponified product is manufactured by copolymerizing ethylene and vinyl acetate and then saponifying the copolymer obtained. Thus an ethylene-vinyl acetate copolymer is also an important raw material for the saponified product.

For continuous polymerization of an ethylene-vinyl acetate copolymer, a high-pressure polymerizing vessel with a jacket, coil or a reflux condenser is normally used into which ethylene and vinyl acetate, which are raw materials, are introduced together with an alcoholic solvent such as methanol. But it has been a problem that the formation of gelled products or the growth of scales on the wall surface of the polymerizing vessel may hinder a long run of continuous polymerization.

As a countermeasure against this problem, JP patent publication 2-52922 discloses a method in which vinyl acetate (and a solvent) is passed through a heat exchanger provided outside a polymerizing vessel to cool it, letting the ethylene taken out of the polymerizing vessel absorbed into the vinyl acetate and solvent, and introducing the mixture into the polymerizing vessel to vaporize the ethylene in the vessel, thereby removing the polymerizing heat.

The present applicant studied such a method and found out that in order to effectively carry out such a method, it is necessary to considerably cool the vinyl acetate and solvent to be introduced into the polymerizing vessel and increase the amount of the ethylene to be absorbed, but if the amount of ethylene is excessive, foaming occurs in the polymerizing vessel, causing pollution of the polymerizing vessel or clogging of the piping.

Therefore, as measures for preventing the formation of scale in polymerization using a conventional polymerizing vessel provided with a jacket or coil for cooling, the present applicant proposed a method of cooling the top plate portion of the polymerizing vessel (JP patent publications 11-116637, 11-116638).

But it was found out that in the abovesaid method, although it can prevent the formation of scale on a vapor phase portion which does not contact the polymerizing reaction liquid, the effect of preventing scales at the liquid-contact portion is insufficient.

SUMMARY OF THE INVENTION

According to the present invention, there is provided a method of manufacturing an ethylene-vinyl acetate copolymer wherein continuous polymerization of ethylene and vinyl acetate is carried out in a polymerizing vessel provided with a jacket and/or a coil for cooling on condition that the heat transfer area of the jacket and/or coil and the polymerizing calorific value per hour satisfy the following formula:

$$A < Q/2000$$

wherein A is the heat transfer area (m$^2$) and Q is the calorific value (kcal/hr) for polymerization.

DETAILED DESCRIPTION OF THE PREFERRED EMBODIMENT

Hereinbelow, the present invention will be described in more detail.

As a method of copolymerizing ethylene and vinyl acetate, solution polymerization, suspension polymerization, bulk polymerization and emulsion polymerization are applicable. In the present invention, solution polymerization and bulk polymerization are preferable. Hereinbelow, description is made with solution polymerization as an example. But the method is not limited thereto.

In such copolymerization, ethylene and vinyl acetate may be polymerized in a solvent in the existence of a catalyst. As a solvent, an alcohol having a carbon number of 4 or less or a mixed solvent containing as the major component an alcohol having a carbon number of 4 or less can be used. As such an alcohol, methanol, ethanol or propanol can be used, but methanol is preferable. As the amount of the solvent, 1 to 60 parts by weight with respect to 100 parts by weight of vinyl acetate is preferable.

As a catalyst, if it is a radical initiator, any can be used. However, the following are preferable: azo compounds such as 2,2'-azobis-(2,4-dimethylvaleronitrile), 2,2'-azobis-(2,4,4-trimethylvaleronitrile), 2,2'-azobisisobutyronitrile, and 2,2'-azobis-(4-methoxy-2,4-dimethylvaleronitrile); peroxyesters such as t-butyl peroxyneodecanoate, t-hexyl peroxyneodecanoate, t-amyl peroxyneodecanoate, 1,1,3,3-tetramethylbutyl peroxyneodecanoate and t-butylperpivalate; peroxy-di-carbonates such as bis-(4-t-butylcyclohexyl)peroxy-di-carbonate, di-cyclohexylperoxy-di-carbonate, bis(2-ethylhexyl)di-sec-butylperoxy-di-carbonate and di-isopropylperoxy-di-carbonate; and diacylperoxides such as acetylperoxide, benzoylperoxide, di-lauroylperoxide, di-decanoylperoxide, di-octanoylperoxide and di-propylperoxide.

Although the amount of the catalyst depends on the polymerization temperature and the kind of catalyst, with respect to 100 parts by weight of vinyl acetate, 0.002–0.1 parts by weight is preferable (more preferably 0.004–0.07 parts by weight, most preferably 0.006–0.06 parts by weight). If it is less than 0.002 parts by weight, the catalytic efficiency would be bad and the polymerization would not proceed smoothly and a longer time would be taken for polymerization. If over 0.1 part by weight, the control of polymerization may become difficult or even after the end of polymerization, the catalyst may remain, thus causing undesirable reaction after the end of polymerization.

As a method of feeding vinyl acetate and a catalyst, the following can be used: ① vinyl acetate, solvent and catalyst are mixed together beforehand and fed together, ② a catalyst dissolved in a solvent, vinyl acetate and a solvent are fed separately, ③ vinyl acetate and a mixed liquid of a catalyst and a solvent are fed separately, or ④ a mixed liquid of vinyl acetate and a solvent and a mixed liquid of a catalyst and a solvent are fed separately.

The polymerizing temperature is preferably 40 to 80° C., and more preferably 55 to 77° C. If less than 40° C., a long time would be taken for polymerization. In order to shorten the polymerizing time, the amount of catalyst has to be increased. Conversely, if over 80° C. control of polymerization would become difficult. The average residence time of the polymerization reaction liquid in the polymerizing vessel is preferably 2 to 8 hours, and more preferably 2 to 6 hours. If the residence time is less than 2 hours, the polymerizing temperature or the amount of the catalyst has to be increased. This will make it difficult to control the polymerization. If over 8 hours, the productivity would decrease.

The conversion of vinyl acetate is, from a productivity viewpoint, preferably set as high as possible so long as polymerization control is possible, but in the present invention, it is preferably set at 25 to 60% (more preferably 35 to 50%). If less than 25%, it is economically disadvantageous because the energy cost for recycling unreacted vinyl acetate and ethylene increases. Also, the function and effect of the present invention would not reveal sufficiently because the amount of gelled products and scale formed is relatively small. If over 60%, the viscosity of the polymerization reaction liquid would be so high that control of the polymerizing temperature becomes difficult.

Also, the ethylene content in the obtained ethylene-vinyl acetate copolymer is preferably about 10 to 60 mol % in view of various properties of the saponified product obtained by saponifying the copolymer as described below. The pressure of ethylene is set at about 0.9 to 8 MPa. Of course, according to applications, the ethylene content may be less than 10 mol % or over 60 mol %.

Further, according to the present invention, besides ethylene and vinyl acetate, the material may contain an ethylene-like unsaturated monomer copolymerizable with them as a copolymerizing component. Such a monomer includes olefins such as propylene, isobutylene, α-octene, α-dodecene and α-octadecene; unsaturated acids or their salts or mono- or di-alkyl esters such as acrylic acid, methacrylic acid, crotonic acid, maleic acid, maleic anhydride and itaconic acid; nitrites such as acrylonitrile and methacrylonitrile; amides such as acrylamide and methacryloamide; olefin sulfonic acids or their salts such as ethylene sulfonic acid, allyl sulfonic acid and methaallyl sulfonic acid; alkyl vinyl ethers; N-acrylamide methyltrimethylammonium chloride, allyltrimethylammonium chloride, dimethylallyl vinyl ketone, N-vinyl pyrrolidone, vinyl chloride, vinylidene chloride; polyoxyalkylene(metha)allyl ether such as polyoxyethylene(metha)allyl ether and polyoxypropylene (metha)allyl ether; polyoxyalkylene (metha)acrylates such as polyoxyethylene(metha)acrylate and polyoxypropylene (metha)acrylate; polyoxyalkylene (metha)acrylamides such as polyoxyethylene(metha)acrylamide and polyoxypropylene (metha)acrylamide; polyoxyethylene(1-(metha)acrylamide-1,1-dimethylpropyl)ester, polyoxyethylene vinyl ether, polyoxypropylene vinyl ether, polyoxyethylene allyl amine, polyoxypropylene allyl amine, polyoxyethylene vinyl amine and polyoxypropylene vinyl amine.

The present invention is characterised in that continuous polymerization of ethylene and vinyl acetate is carried out in a polymerizing vessel having a cooling jacket and/or coil, on condition that the heat transfer area (A in m$^2$) of the jacket and/or coil and the polymerizing calorific value per hour (Q in kcal/hr) satisfy the following formula (1).

$$A < Q/2000 \tag{1}$$

The heat transfer area referred to in the present invention is, for the jacket, the area of the portion which the polymerizing reaction liquid contacts in the surface area of the polymerizing vessel cooled by the jacket, and for the coil, the area of the portion which the polymerizing reaction liquid contacts.

Such a heat transfer area can be determined from the volume of the polymerization reaction liquid and the shape and internal volume of the polymerizing vessel. But actually, if the area where the polymerization reacting liquid actually contacts can be specified, it can be determined, but it is not limited thereto.

The volume of the polymerization reaction liquid can be calculated from the following formula:
Volume (in m$^3$) of the polymerization reaction liquid= $(1.13M+1.33S+2.27E) \times \theta/1000$
where M: Amount of vinyl acetate (kg/hr)
S: Amount of solvent (kg/hr)
θ: Average residence time (hr) of the polymerization reaction liquid
E: value calculated by the following formula:

$$E=\exp(0.406P-0.018T-2.31) \times M + \exp(0.341P-0.018T-2.49) \times S$$

where P: pressure (MPa) of ethylene in the polymerizing vessel
T: polymerizing temperature (° C.)

Also, if both a jacket and coil are used as the cooling means, A is the sum of the heat transfer area of the jacket and that of the coil.

As the jacket and coil provided on the polymerizing vessel, any known one can be used. For example, for the jacket, one can be used in which the outside of the polymerizing vessel is covered so that a refrigerant can be passed substantially over the entire area of the side wall and bottom, or one in which only the side wall is covered with a refrigerant phase. As the coil, a stainless spiral pipe having an inner diameter of about 25 to 150 mm can be used. Normally, it is provided in the polymerizing vessel at a position where it contacts the polymerization reaction liquid.

In order to increase the function and effect of the present invention, it is preferable to cool the surface inside the polymerizing vessel that contacts the polymerization reaction liquid as much as possible e.g. by a jacket and/or coil, and also to reduce the surface area as much as possible.

Through such a jacket or coil, water is generally passed. The temperature and flow rate of water are controlled such that the temperature of the polymerization reaction liquid will be kept at the target temperature.

But, if the cooling area is too small, the temperature of the refrigerant supplied to the jacket, etc. must be extremely low. In such a case, it may be difficult to control the polymerization temperature, though depending on the state of mixing in the polymerizing vessel. Thus, actually the following relation should be met: $(Q/20000) < A < (Q/2000)$, more preferably $(Q/11000) < A < (Q/3500)$.

The calorific value (Q: kcal/hr) per hour is calculated from the polymerizing rate of vinyl acetate, the residence time of polymerization reaction liquid and the composition of the polymer produced, based on the polymerizing heat of vinyl acetate and ethylene. As the polymerizing heat of vinyl acetate and ethylene, 21.3 and 22.2 kcal/mol may be used, respectively.

Also, in the present invention, it is preferable that the difference between the temperature of the refrigerant supplied to the jacket and/or coil and the polymerizing temperature is 12° C. or over (more preferably 20° C. or over, and most preferably 30° C. or over). If the difference is less than 12° C., the effect of suppressing the formation of gelled products and scale would decrease. Such a temperature difference is adjustable by changing the residence time in the polymerizing vessel or the polymerizing rate.

By the manufacturing method of the present invention, an ethylene-vinyl acetate copolymer is obtained while suppressing the formation of gelled products and scale. Such an ethylene-vinyl acetate copolymer can be used as adhesives, paints, fiber/fabric processing agents, paper/leather processing agents, binders for various materials, mixing liquids for cement and mortar, etc. In particular, it is also useful as a raw material for saponified products of ethylene-vinyl acetate copolymer.

The ethylene content of the ethylene-vinyl acetate copolymer used for the manufacture of ethylene-vinyl acetate copolymer saponified products is preferably 10 to 60 mol % (more preferably 20 to 60 mol %). If the content is less than 10 mol %, the melt moldability would be too low in melt-molding the ethylene-vinyl acetate copolymer saponified product obtained, and also the gas barrier properties of the obtained melt-molded product at a high humidity would lower considerably. If it exceeds 60 mol %, the mechanical strength and gas barrier property of the melt-molded products obtained by melt-molding the saponified product would be insufficient. The ethylene content is, as described above, controllable by adjusting the ethylene pressure in the polymerizing vessel.

The ethylene-vinyl acetate copolymer obtained in the present invention is saponified in the coexistence of a saponifying catalyst.

Specifically, the ethylene-vinyl acetate copolymer is dissolved in an alcohol (methanol is ordinarily used) or an alcohol-containing solvent so that its concentration will be about 30–60 weight %, and reacted for saponification at a temperature of 40–140° C. by adding an alkali catalyst. (Normally, an alkali metal hydroxide such as sodium hydroxide or potassium hydroxide is used. In certain circumstances, an acidic catalyst is used).

The degree of saponification of the vinyl acetate component in the saponified product of ethylene-vinyl acetate copolymer obtained by such saponification is preferably 80–100 mol % (more preferably 90–100 mol %, most preferably 95–100 mol %). If the degree of saponification is less than 80 mol %, the thermal stability when melt molding the saponified product would be poor. Also, the mechanical strength and gas barrier properties of the molded product obtained will considerably decrease.

Next, an alcohol solution of the obtained ethylene-vinyl acetate copolymer saponified product or its alcohol/water solution obtained by suitably adjusting the composition by adding water is used as a solution for manufacturing strands.

The alcohol or alcohol/water solution of the ethylene-vinyl acetate copolymer saponified product is extruded into a solidifying liquid such as water or a water/alcohol solution to get solid strands. The solid strands are then cut into pellets and rinsed with water.

The rinsed pellets are preferably subjected to chemical treatment e.g. by immersing them in an aqueous solution of chemicals such as acids and/or their salts. As such chemicals, formic acid, acetic acid, adipic acid, other carboxylic acid, phosphoric acid, boric acid or their salts may be used. Among them, acetic acid is preferable.

The pellets obtained are melt-molded into desired products after being dried. As temperature conditions for melt-molding, about 160–260° C. is preferable. In molding, known additives such as reinforcing materials such as glass fiber and carbon fiber, fillers, colorants, stabilizers such as hydrotalcite, foaming agents, drying agents may be suitably added in suitable amounts as necessary. Also, to the ethylene-vinyl acetate copolymer saponified product, a thermoplastic resin for modification may be blended in a suitable amount.

As the melt molding method, any known one such as injection molding, compression molding or extrusion molding can be employed. As an extrusion molding method, a T-die method, blow molding method, pipe extrusion method, wire extrusion method, irregularly shaped die extrusion method, inflation method, etc. can be cited. The ethylene-vinyl acetate copolymer saponified product may be molded by itself into films, sheets, tapes, bottles, pipes, filaments, extruded products with irregularly shaped sections, etc. However, co-extrusion molding with other thermoplastic resin layer also can be applied.

EXAMPLES

Hereinbelow, the present invention will be described specifically with reference to Examples. In Examples, "parts" and "%" are in weight if not otherwise stated.

Example 1

Using a polymerizing vessel with a capacity of 1300 liters and having a cooling jacket and an agitator, continuous polymerization of ethylene and vinyl acetate was carried out under the conditions shown in Table 1.

During continuous polymerization, the flow rate of a refrigerant (water) introduced into the jacket was kept constant, and the polymerizing temperature was controlled to a target value by adjusting the temperature of the refrigerant at inlet of the jacket.

For 100 days after the start of polymerization, the concentration of gelled products (methanol insoluble content) in the reaction liquid discharged from the polymerizing vessel was measured periodically. It was less than 50 ppm from beginning to end. The interior of the polymerizing vessel was observed after 100 days, but scale was scarcely observed.

The content (ppm) of such gelled products in the polymerization reaction liquid was measured by diluting the reaction liquid with methanol by 20 times, heating it for two hours at 60° C., filtering it with a 400-mesh wire netting, washing it with an equivalent amount of methanol at 60° C., drying the gelled product remaining on the wire netting, and measuring the weight.

When 500 liters of the polymerization reaction liquid obtained by continuous polymerization (on the 100th day from start) was passed through a cartridge type polypropylene filter of 25-micron mesh, no clogging was observed in the filter. It was possible to let the entire amount of 500 liters pass.

The ethylene-vinyl acetate copolymer solution obtained by the continuous polymerization (on the 100th day from start) was treated with methanol vapor to remove the remaining vinyl acetate and a methanol solution of the ethylene-vinyl acetate with 50% resin content was obtained.

Then 100 parts of the solution was treated with 160 parts of methanol solution including 0.017 equivalent mol of sodium hydroxide against vinyl acetate unit in the ethylene-vinyl acetate copolymer to saponify the ethylene-vinyl acetate copolymer. The saponification reaction was carried out for one hour at 120–130° C. and pressure of 0.4 Mpa. The side product (methyl acetate) of the saponification reaction was distilled out of the reaction phase with methanol. The degree of saponification of the saponified ethylene-vinyl acetate copolymer was 99.8 mol % and the resin content of the solution was 30%.

Then the saponified ethylene-vinyl acetate copolymer solution was treated with steam under pressure of 0.3 Mpa at temperature of 100–110° C. to adjust the composition of the solution. Some methanol was distilled out by applying steam and a clear methanol/water solution of saponified ethylene-vinyl acetate (the resin content was 40%) was obtained.

The obtained methanol/water solution was extruded in strands through a cylindrical nozzle at a rate of 10 kg/hour into water/methanol solution (weight ratio: 95/5) kept at 5° C. and was solidified. After solidifying, the strands were cut to obtain ethylene-vinyl acetate copolymer saponified product in the form of pellets.

100 parts of the obtained pellets including water and methanol were rinsed with 300 parts of water for one hour. This rinsing was repeated 2 more times. Then the pellets were rinsed with 300 parts of 0.1% acetic acid aqueous solution for 2 hours. The rinsed pellets were dried with 80° C. air for 5 hours and then with 120° C. air for 17 hours. After drying, the moisture in the pellets was 0.2%.

The ethylene-vinyl acetate copolymer saponified product thus obtained was formed into films under the following conditions, and the films obtained were evaluated for transparency and fish eyes as follows.
(Film Forming Conditions)
Extruder: 40 mm-diameter extruder
Screw: L/D=28, compression ratio: 3.2
Die: Coat hanger type die
Extruding temperature: 230° C. at cylinder tip portion die: 210° C.
Revolving number of screw: 40 rpm
Film thickness: 30 $\mu$m (Transparency)
A 12-point printed letter was visually observed through the films obtained and they were evaluated as follows.
○ . . . letter was clearly seen
X . . . letter slightly blurred
(Fish Eyes)
By visually observing the films obtained, the number of fish eyes per 100 cm$^2$ of each film was measured.
○ . . . 5 or less
Δ . . . 6–9
X . . . 10 or more The evaluation results of the ethylene-vinyl acetate saponified product are shown in Table 2.

Example 2

Except that with the inlet temperature of the refrigerant (water) introduced into the jacket kept constant, the polymerizing temperature was controlled to the target value by adjusting the temperatures of the vinyl acetate and methanol to be fed into the polymerizing vessel, polymerization was carried out in a similar manner to Example 1.

For 100 days after the start of polymerization, the content of gelled product (methanol insoluble content) in the reaction liquid discharged from the polymerizing vessel was measured periodically. It was 50 ppm or less from beginning to end. The interior of the polymerizing vessel was observed after 100 days, but scale was scarcely observed.

500 liters of the polymerization reaction liquid obtained by continuous polymerization (on the 100th day from start) was passed through a filter in the same manner as in Example 1, but no clogging was observed in the filter. It was possible to let the entire amount of 500 liters pass.

Using the ethylene-vinyl acetate copolymer obtained in the continuous polymerization (on the 100th day from start), the ethyle-vinyl acetate copolymer saponified product was obtained in the same manner as in Example 1.

The evaluation results of the ethylene-vinyl acetate copolymer saponified product are shown in Table 2.

Example 3

Except that the pressure of ethylene, the feed rate of the vinyl acetate and ethylene, and the feed rate of the polymerizing catalyst were changed as shown in Table 1, polymerization was carried out in a similar manner to Example 1.

For 100 days after the start of polymerization, the content of gelled product (methanol insoluble content) in the reaction liquid discharged from the polymerizing vessel was measured periodically. It was below 50 ppm from beginning to end. The interior of the polymerizing vessel after 100 days was observed, but scale was scarcely observed.

500 liters of the polymerization reaction liquid obtained by the continuous polymerization (on the 100th day from start) was passed through a filter in the same manner as in Example 1. No clogging was observed in the filter and it was possible to let the entire amount of 500 liters to pass.

Using the ethylene-vinyl acetate copolymer obtained in the continuous polymerization (on the 100th day from start), the saponified product of the copolymer was obtained in the same manner as in Example 1.

The evaluation results of the ethylene-vinyl acetate copolymer saponified product obtained are shown in Table 2.

Comparative Example 1

Except that a cooling coil was provided in the polymerizing vessel together with a jacket so that the heat transfer area will be 6 m$^2$, polymerization was carried out in a similar manner as in Example 1.

After the start of polymerization, the content of gelled product (methanol insoluble content) in the reaction liquid discharged out of the polymerizing vessel was measured periodically. It was below 50 ppm for about 3 days, but thereafter it increased, and 10 days later, it reached 800 ppm. 50 days later, scales were observed considerably in the polymerizing vessel.

When 500 liters of the polymerization reaction liquid obtained by the continuous polymerization (on the 50th day from start) was passed through a filter in the same manner as in Example 1, clogging occurred in the filter and only 50 liters passed through the filter.

Using the ethylene-vinyl acetate copolymer obtained in the continuous polymerization (on the 50th day from start), the ethyle-vinyl acetate copolymer saponified product was obtained in the same manner as in Example 1.

The evaluation results of the ethylene-vinyl acetate copolymer saponified product are shown in Table 2.

In the method of manufacturing an ethylene-vinyl acetate copolymer according to the present invention, because the calorific value during polymerization and the heat transfer area in the cooling means are controlled in a specific relation, it is possible to suppress formation of gelled product and scale during manufacture, and thus it is possible to carry out polymerization stably for a long time. The ethylene-vinyl acetate copolymer saponified product obtained from the ethylene-vinyl acetate copolymer manufactured by such a method is superior in moldability and also transparency. It is also possible to obtain molded products that have fewer fish eyes.

TABLE 1

|  | Example 1 | Example 2 | Example 3 |
|---|---|---|---|
| Polymerizing Temperature (° C.) | 50 | 50 | 50 |
| Pressure of ethylene (Mpa) | 3.8 | 3.8 | 4.9 |
| Feed rate of vinyl acetate (kg/hr) | 95 | 95 | 79 |
| Feed rate of methanol (kg/hr) | 17.5 | 17.5 | 17.5 |
| Feed rate of ethylene (kg/hr) | 20.5 | 20.5 | 25.6 |
| Average residence time (hr) | 5 | 5 | 5 |
| Discharge rate of polymerization reaction liquid (kg/hr) | 133 | 133 | 122 |
| [Composition of polymerization reaction liquid] | | | |
| Copolymer (%) | 25 | 25 | 24 |
| Vinyl acetate (%) | 50 | 50 | 46 |
| Methanol (%) | 13 | 13 | 14 |
| Ethylene (%) | 12 | 12 | 16 |
| Heat transfer area (A; m$^2$) | 3.4 | 3.4 | 3.4 |
| Polymerization heat release value (Q; kcal/hr) | 10658 | 10658 | 10658 |
| Q/2000 | 5.3 | 5.3 | 5.3 |
| Refrigerant charge temperature (° C.) | 27~30 | 29 | 27~30 |

2,2'-Azobisisobulylonitrile used as a catalyst

TABLE 2

|  | Transparency | Fish eye |
|---|---|---|
| Example 1 | ○ | ○ |
| Example 2 | ○ | ○ |
| Example 3 | ○ | ○ |
| Comparative Example 1 | X | X |

What is claimed is:

1. A method of manufacturing an ethylene-vinyl acetate copolymer which comprises carrying out continuous polymerization of ethylene and vinyl acetate in a polymerizing vessel with a jacket and/or a coil for cooling, wherein the heat transfer area of the jacket and/or coil and the polymerizing calorific value per hour satisfy the following formula:

$$A < Q/2000$$

wherein A is the heat transfer area (m$^2$) and Q is the calorific value (kcal/hr) for polymerization.

2. A method of manufacturing an ethylene-vinyl acetate copolymer as claimed in claim 1 wherein polymerization is carried out by solution polymerization or bulk polymerization.

3. A method of manufacturing an ethylene-vinyl acetate copolymer as claimed in claim 1 wherein the conversion of the vinyl acetate is 25 to 60%.

4. A method of manufacturing an ethylene-vinyl acetate copolymer as claimed in claim 2 wherein the conversion of the vinyl acetate is 25 to 60%.

* * * * *